(12) United States Patent
Tang (10) Patent No.: US 10,820,246 B2
(45) Date of Patent: *Oct. 27, 2020

(54) METHOD FOR SETTING WI-FI ROAMING, AND RELATED PRODUCTS (71) Applicant: Guangdong Oppo Mobile Telecommunications Corp., Ltd., Dongguan, Guangdong (CN)

(72) Inventor: Rongzheng Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,790

(22) Filed: Mar. 4, 2019

(65) Prior Publication Data
US 2019/0208454 A1  Jul. 4, 2019

Related U.S. Application Data (63) Continuation of application No. PCT/CN2017/109958, filed on Nov. 8, 2017.

(30) Foreign Application Priority Data

Dec. 7, 2016 (CN) .......................... 2016 1 1117859

(51) Int. Cl.
*H04W 36/30* (2009.01)
*H04B 17/327* (2015.01)
(Continued)

(52) U.S. Cl.
CPC .......... *H04W 36/30* (2013.01); *H04B 17/318* (2015.01); *H04B 17/327* (2015.01);
(Continued)

(58) Field of Classification Search
CPC ..... H04W 16/14; H04W 84/12; H04W 24/10; H04W 16/20; H04W 52/242; H04W 64/00; H04W 52/245
See application file for complete search history.

(56) References Cited

U.S. PATENT DOCUMENTS 8,155,081 B1    4/2012  Mater et al.
2002/0102977 A1  8/2002  Shi
(Continued)

FOREIGN PATENT DOCUMENTS

CN    103999511 A    8/2014
CN    105101150 A    11/2015
(Continued)

OTHER PUBLICATIONS

Zhang Li-li et al, A new adaptive vertical handoff algorithm of wireless heterogeneous network, Information Technology, Dec. 31, 2011, pp. 4-7.
(Continued)

*Primary Examiner* — Asad M Nawaz
*Assistant Examiner* — Najeeb Ansari (57) ABSTRACT

A method for setting Wi-Fi roaming, and a terminal are provided. The method includes the following. A first received signal strength indication (RSSI) value is obtained when a terminal is connected to a first AP. An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is not greater than the preset RSSI lower limit, where the roaming threshold is used to trigger the terminal to roam between different Wi-Fi networks.

15 Claims, 4 Drawing Sheets (51) Int. Cl.
    *H04W 24/02*    (2009.01)
    *H04W 36/08*    (2009.01)
    *H04W 36/00*    (2009.01)
    *H04B 17/318*   (2015.01)

(52) U.S. Cl.
    CPC ..... *H04W 24/02* (2013.01); *H04W 36/00837* (2018.08); *H04W 36/08* (2013.01)

(56) References Cited

U.S. PATENT DOCUMENTS

| | | |
|---|---|---|
| 2005/0221828 A1 | 10/2005 | Wakuta et al. |
| 2010/0020769 A1 | 1/2010 | Ma et al. |
| 2012/0230304 A1* | 9/2012 | Barbu .................. H04W 48/18 370/338 |
| 2012/0230305 A1* | 9/2012 | Barbu .................. H04W 48/20 370/338 |
| 2014/0315555 A1 | 10/2014 | Zhang et al. |
| 2015/0350993 A1* | 12/2015 | Kasten .................. H04W 48/16 370/332 |
| 2016/0183181 A1* | 6/2016 | Lee ........................ H04B 17/26 370/338 |
| 2016/0227544 A1* | 8/2016 | Katar .................... H04W 48/16 |
| 2017/0019837 A1* | 1/2017 | Katar .................... H04W 8/22 |

FOREIGN PATENT DOCUMENTS

| | | |
|---|---|---|
| CN | 105704717 A | 6/2016 |
| WO | 2007050228 A2 | 5/2007 |
| WO | 2015077248 A1 | 5/2015 |

OTHER PUBLICATIONS

International search report issued in corresponding international application No. PCT/CN2017/109958 dated Jan. 30, 2018.

Extended European search report issued in corresponding European application No. 17878417.9 dated Aug. 28, 2019.

* cited by examiner

METHOD FOR SETTING WI-FI ROAMING, AND RELATED PRODUCTS

CROSS-REFERENCE TO RELATED APPLICATION(S)

This application is a continuation of International Application No. PCT/CN2017/109958, filed on Nov. 8, 2017, which claims priority to Chinese Patent Application No. 201611117859.6, filed on Dec. 7, 2016, the disclosures of both of which are hereby incorporated by reference in their entireties.

TECHNICAL FIELD

The present disclosure relates to the technical field of communications, and particularly to a method for setting wireless fidelity (Wi-Fi) roaming, and a terminal.

BACKGROUND

With the development of communication technologies, Wi-Fi networks have been widely used, and people can connect terminals to the Wi-Fi networks to access the Internet anytime and anywhere.

Wi-Fi networks in public environments such as shopping malls and libraries are mostly established via extended service sets (ESSs). The ESS supports a roaming function, and a station (STA, i.e., a terminal that can be connected to a wireless network) can roam between different basic service sets (BSSs) in the ESS to achieve a seamless connection, that is, an ongoing network service is not interrupted, and an Internet protocol (IP) address of the STA is not changed.

The purpose of Wi-Fi roaming (that is, roaming between Wi-Fi networks) is to provide better Wi-Fi network services. However, at present, the Wi-Fi roaming has the following two problems.

One problem is frequent roaming, that is, the roaming is triggered frequently when the roaming is not required, resulting in a long delay of being connected to the Wi-Fi network; another one is slow roaming, that is, the roaming is not triggered when the roaming is required, resulting in that an access point (AP) providing better signals cannot be connected to.

Therefore, it is desirable to provide a service of Wi-Fi roaming, where roaming occurs properly via the service.

SUMMARY

Implementations of the present disclosure provide a method for setting Wi-Fi roaming, a terminal, and a non-transitory computer-readable storage medium.

According to a first aspect of the implementations of the present disclosure, a method for setting Wi-Fi roaming is provided. The method includes the following.

A first received signal strength indication (RSSI) value is obtained when a terminal is connected to a first access point (AP). An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

According to a second aspect of the implementations of the present disclosure, a terminal is provided. The terminal includes at least one processor and a computer readable memory, coupled to the at least one processor and storing at least one computer executable instruction therein, which when executed by the at least one processor, causes the at least one processor to carry out the following actions. A first received signal strength indication (RSSI) value o is obtained when the terminal is connected to a first AP. An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

According to a third aspect of the implementations of the present disclosure, a non-transitory computer-readable storage medium is provided. The storage medium stores at least one computer program which, when executed by at least one processor, causes the at least one processor to carry out the following actions. A first received signal strength indication (RSSI) value is obtained when a terminal is connected to a first access point (AP). An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

BRIEF DESCRIPTION OF DRAWINGS

To describe technical solutions in implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

For illustrating objects, technical solutions, and advantages of the present disclosure more clearly, the following will further illustrate the present disclosure in detail with reference to the accompanying drawings. Apparently, the described implementations are merely some rather than all implementations of the present disclosure. All other implementations obtained by those of ordinary skill in the art based on the implementations of the present disclosure without creative efforts shall fall within the protection scope of the present disclosure.

The implementations of the present disclosure provide a method for setting Wi-Fi roaming, and a terminal. A roaming threshold for triggering Wi-Fi roaming can be dynamically adjusted according to a received signal strength indication (RSSI) value of a wireless network signal currently received, so as to avoid frequent roaming or slow roaming caused by a mismatch between the roaming threshold and a current network situation. The details are described below.

According to a first aspect, a method for setting Wi-Fi roaming is provided. The method includes the following. A first received signal strength indication (RSSI) value is obtained when a terminal is connected to a first access point (AP). An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

In one implementation, the method further includes the following. A second RSSI value is obtained when a geographical position of the terminal changes. Roaming scan is activated to connect the terminal to a second AP, when the second RSSI value is less than the roaming threshold.

In one implementation, before activating the roaming scan, the method further includes the following. A list of the geographic position is obtained, where the list contains identifiers of multiple accessible APs and strength of signals from the accessible APs, and the second AP to be connected to is selected, where the second AP is one of the accessible APs that is operable to transmit a signal having the highest strength.

In one implementation, before activating the roaming scan, the method further includes the following. A list of the geographic position is obtained, where the list contains identifiers of multiple accessible APs and a security level of each of the accessible APs, and the second AP to be connected to is selected, where the second AP is one of the accessible APs having the highest security level.

In one implementation, the method further includes the following after activating the roaming scan. Whether the terminal is able to access a network is determined. The terminal is reconnected to the first AP based on a determination that the terminal is unable to access the network.

In one implementation, the method further includes the following after activating the roaming scan. Whether the terminal is able to access a network is determined. The second AP is added to a blacklist to prevent the terminal from being connected to the second AP based on a determination that the terminal is unable to access the network.

In one implementation, the method further includes the following after activating the roaming scan. Whether the terminal is able to access a network is determined. A third AP from an extended service set (EES) is selected based on a determination that the terminal is unable to access the network, where the third AP is operable to transmit a signal having strength higher than that of signals from other APs in the EES other than the second AP. The terminal is connected to the third AP.

In one implementation, determining whether the terminal is able to access the network includes the following. A test data frame is sent to a wireless station (STA) failing to be connected the second AP. The terminal is determined to be able to access the network when the terminal receives a response frame from the STA, and the terminal is determined to be unable to access the network when the terminal fails to receive the response frame from the STA.

In one implementation, before obtaining the first RSSI value, the method further includes the following. A sliding track input by a user is obtained. A Wi-Fi network function of the terminal is activated to search for at least one accessible AP, when the sliding track is for activating the Wi-Fi network function. The terminal is connected to the first AP when the first AP is detected.

According to a second aspect, a terminal is provided. The terminal includes at least one processor and a computer readable memory, coupled to the at least one processor and storing at least one computer executable instruction therein, which when executed by the at least one processor, causes the at least one processor to carry out the following actions. A first received signal strength indication (RSSI) value is obtained when the terminal is connected to a first access point (AP). An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

According to a third aspect, a non-transitory computer-readable storage medium is provided. The storage medium stores at least one computer program which, when executed by at least one processor, causes the at least one processor to carry out the following actions. A first received signal strength indication (RSSI) value is obtained when a terminal is connected to a first access point (AP). An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

Figure 1:
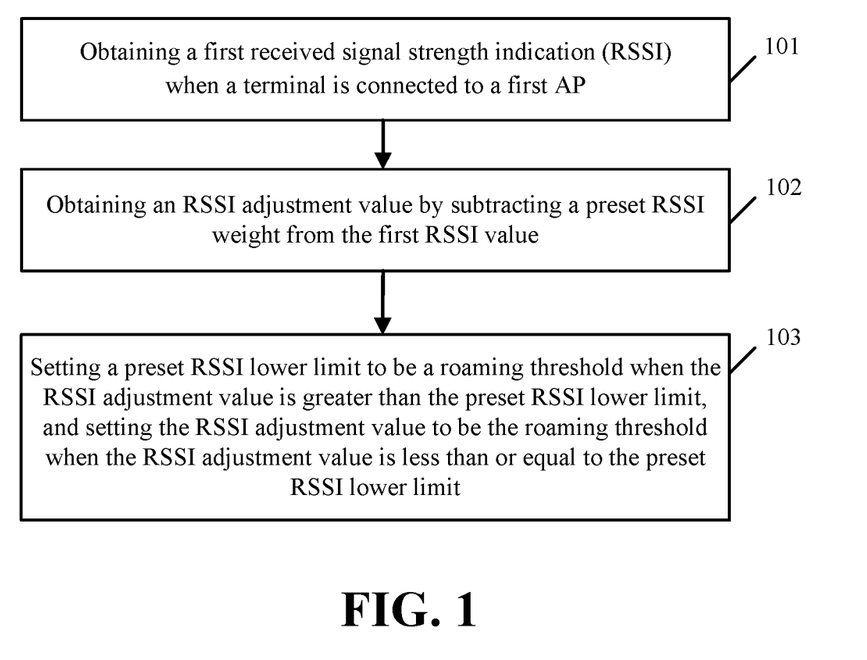
FIG. 1 is a flow chart illustrating a method for setting Wi-Fi roaming according to an implementation of the present disclosure.

Referring to FIG. 1, FIG. 1 is a flow chart illustrating a method for setting Wi-Fi roaming according to an implementation of the present disclosure. The method begins at block 101.

At block 101, a first RSSI value is obtained when a terminal is connected to a first AP.

The terminal may be a smart phone, a smart watch, a handheld computer, a tablet computer, a personal digital assistant (PDA), a point of sales (POS), and so on, which will not be repeated in the following.

The terminal may receive a sliding track input by a user, and determine whether the sliding track is an operation for activating a Wi-Fi network function. When the sliding track is the operation for activating the Wi-Fi network function, the Wi-Fi network function is activated to perform network searching, so that an AP, for example the first AP, can be found and connected to. In this way, activating the Wi-Fi network function can be simplified, thereby improving user experience.

After being connected to the first AP, the terminal obtains the first RSSI value of a wireless network signal received by the terminal. The first RSSI value can indicate strength of the wireless network signal currently received from the first AP.

At 102, an RSSI adjustment value is obtained by subtracting a preset RSSI weight from the first RSSI value.

The preset RSSI weight is preset for adjusting the roaming threshold, and is usually about 5 dbm. The RSSI adjustment value is obtained by subtracting the preset RSSI weight from the first RSSI value.

At 103, a preset RSSI lower limit is set to be the roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

The RSSI lower limit is the lowest RSSI value commonly used for triggering roaming. The RSSI lower limit usually ranges from −70 dbm to −80 dbm, and can be set according to different hardware performances.

After being connected to the first AP, a roaming threshold can be adjusted according to strength of a network signal received from the first AP. If the strength of the current network signal is high, the roaming threshold can be set to be high; if the strength of the current network signal is low, the roaming threshold can be set to be low, thereby avoiding frequent roaming caused by a fixed roaming threshold when a network signal of the current environment is poor, or slow roaming caused by the fixed roaming threshold when the network signal of the current environment is good, where the slow roaming may prevent the terminal from being connected to an AP providing better services.

It can be seen that, by adopting the method illustrated in FIG. 1, the roaming threshold for triggering the Wi-Fi roaming can be dynamically adjusted according to the RSSI value of the wireless network signal received by the terminal, thereby avoiding the frequent roaming or the slow roaming caused by a mismatch between the roaming threshold and a current network situation.

Figure 2:
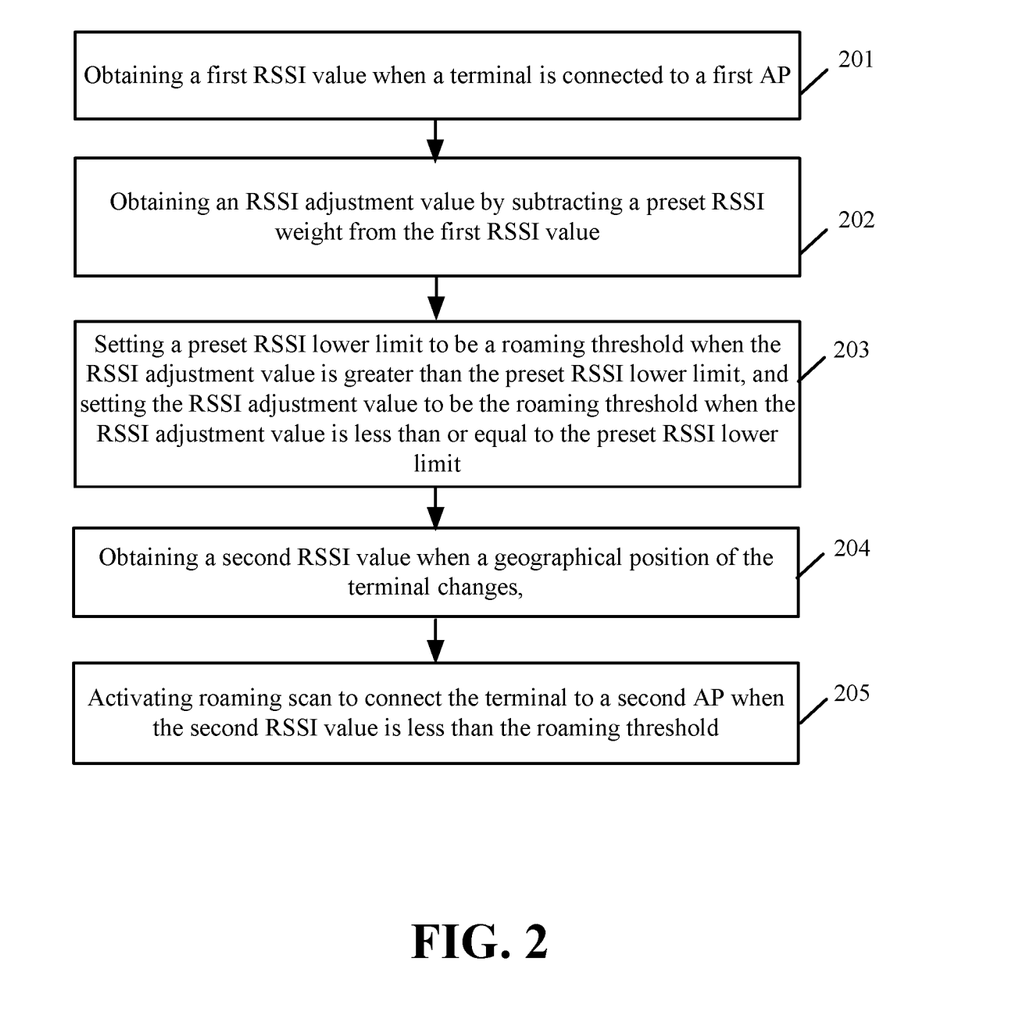
FIG. 2 is a flow chart illustrating another method for setting Wi-Fi roaming according to an implementation of the present disclosure.

Referring to FIG. 2, FIG. 2 is a flow chart illustrating another method for setting Wi-Fi roaming according to an implementation of the present disclosure. As illustrated in FIG. 2, the method begins at block 201.

At 201, a first RSSI value is obtained when a terminal is connected to a first AP.

After being connected to the first AP, the terminal obtains the first RSSI value of a wireless network signal received by the terminal. The first RSSI value can indicate strength of the wireless network signal received from the first AP.

At block 202, an RSSI adjustment value is obtained by subtracting a preset RSSI weight from the first RSSI value.

The preset RSSI weight is preset for adjusting the roaming threshold, and is usually about 5 dbm. The RSSI adjustment value is obtained by subtracting the preset RSSI weight from the first RSSI value.

At 203, the preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

The RSSI lower limit is the lowest RSSI value commonly used for triggering roaming. The RSSI lower limit usually ranges from −70 dbm to −80 dbm, and can be set according to different hardware performances.

In the implementation of the present disclosure, after being connected to the first AP, the roaming threshold can be adjusted according to strength of a network signal received from the first AP. If the strength of the current network signal is high, the roaming threshold can be set to be high; if the strength of the current network signal is low, the roaming threshold can be set to be low, thereby avoiding frequent roaming caused by a fixed roaming threshold when a network signal of the current environment is poor, or slow roaming caused by the fixed roaming threshold when the network signal of the current environment is good, where the slow roaming may prevent the terminal from being connected to an AP providing better services.

At block 204, when a geographical position of the terminal changes, a second RSSI value is obtained.

When a user uses the terminal while walking, the geographical position of the terminal changes, and the RSSI value of the wireless network signal received from the first AP changes with the user's movement.

At block 205, roam scanning is activated to connect the terminal to a second AP when the second RSSI value is less than the roaming threshold.

When the second RSSI value is less than the roaming threshold, the roam scanning is activated to connect the second device to the second AP from which better signals can be received.

Target geographical position information is determined after the geographical position of the terminal changes. A list of the target geographical position information is then obtained, where the list contains identifiers of accessible APs and strength of signals from the accessible APs. The second AP is one of the accessible APs that is operable to transmit a signal having the highest strength, and the second AP is selected to be connected to. The list may be preset by the user and contain identifiers of commonly used APs. The list may also contain identifies of APs that the terminal was successfully connected to in the geographical position. In this way, searching of APs that were determined to be unable to be connected to can be avoided, thereby reducing workload of network searching, and reducing power consumption of the terminal.

In one implementation, in order to improve security of data transmission of the terminal via a Wi-Fi network, the terminal can query in the list for a security level of network service provided by each AP. The second AP has the highest security level, and is selected to be connected to.

After the terminal is connected to the second AP, although the strength of the signal from the second AP is higher than that of the signal from the first AP, the terminal may have no access to a wired local area network through the second AP due to reasons such as system settings and so on. Therefore, after the terminal is connected to the second AP, it needs to determine whether the terminal is able to access a network.

The terminal determines whether the terminal is able to access the network after being connected to the second AP. When it is determined that the terminal is unable to access the network after being connected to the second AP, the terminal is disconnected from the second AP and is reconnected to the first AP.

Based on a determination that the terminal is unable to access the network after being connected to the second AP, the second AP is added to a blacklist to prevent (i.e., forbid) the terminal from being connected to the second AP.

Based on a determination that the terminal is unable to access the network after being connected to the second AP, an extended service set (EES) is searched for determining strength of signals from APs other than from the second AP. A third AP other than the second AP is selected from the EES and is connected to, where the third AP is operable to transmit a signal having the highest strength.

The terminal may determine whether the terminal is able to access the network after being connected to the second AP as follows.

A test data frame is sent to a wireless station (STA) outside a network established by the second AP, i.e., the STA failing to be connected to the second AP. The STA may return a response frame. When the terminal receives the response frame, it is determined that the terminal is able to access the network after being connected to the second AP, and when the terminal fails to receive the response frame, it is determined that the terminal is unable to access the network after being connected to the second AP.

It can be seen that, by adopting the method illustrated in FIG. 2, the roaming threshold for triggering the Wi-Fi roaming can be dynamically adjusted according to the RSSI value of the wireless network signal currently received, thereby avoiding the frequent roaming or the slow roaming caused by a mismatch between the roaming threshold and a current network situation.

Figure 3:
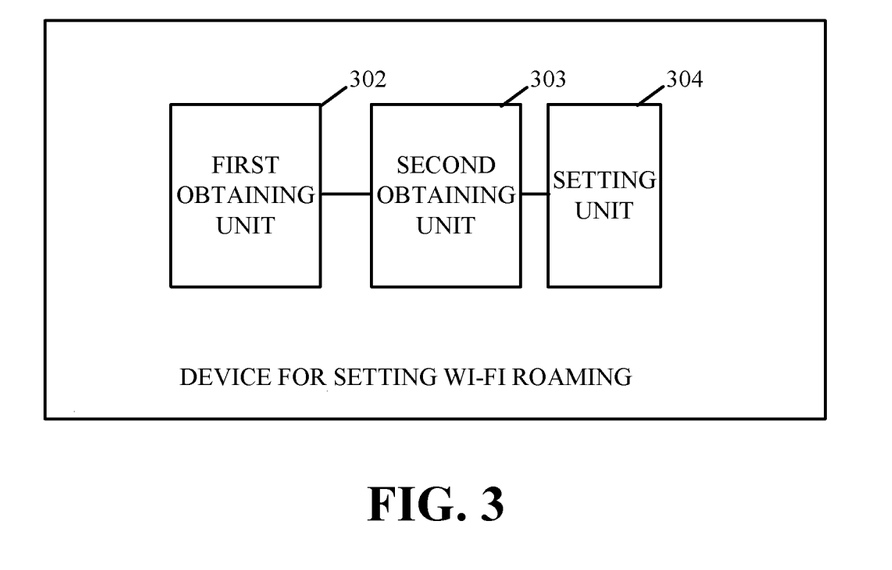
FIG. 3 is a block diagram illustrating a device for setting Wi-Fi roaming according to an implementation of the present disclosure.

Referring to FIG. 3, FIG. 3 is a block diagram illustrating a device for setting Wi-Fi roaming according to an implementation of the present disclosure. As illustrated in FIG. 3, the device includes a first obtaining unit 302, a second obtaining unit 303, and a setting unit 304.

The first obtaining unit 302 is configured to obtain a first RSSI value when a terminal is connected to a first AP.

The second obtaining unit 303 is configured to obtain an RSSI adjustment value by subtracting a preset RSSI weight from the first RSSI value.

The setting unit 304 is configured to set a preset RSSI lower limit to be a roaming threshold when the RSSI adjustment value is greater than the preset RSSI lower limit, and to set the RSSI adjustment value to be the roaming threshold when the RSSI adjustment value is less than or equal to the preset RSSI lower limit, where the roaming threshold is used to trigger the terminal to roam between different Wi-Fi networks.

It can be seen that, by adopting the device illustrated in FIG. 3, the roaming threshold for triggering the Wi-Fi roaming can be dynamically adjusted according to the RSSI value of the wireless network signal currently received, thereby avoiding frequent roaming or slow roaming caused by a mismatch between the roaming threshold and a current network situation.

Figure 4:
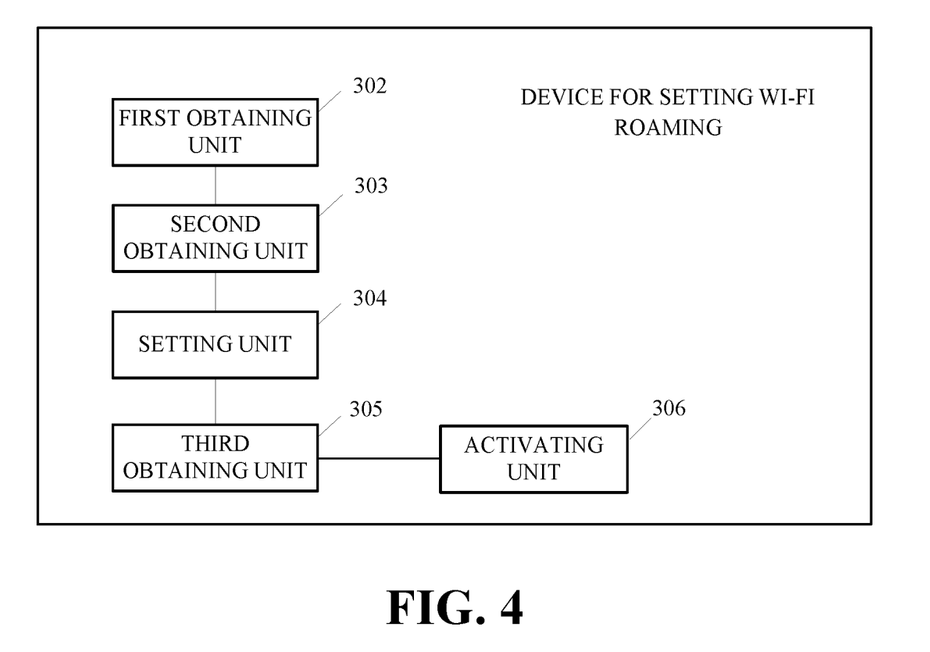
FIG. 4 is a block diagram illustrating another device for setting Wi-Fi roaming according to an implementation of the present disclosure.

Referring to FIG. 4, FIG. 4 is a block diagram illustrating another device for setting Wi-Fi roaming according to an implementation of the present disclosure. The device illustrated in FIG. 4 is obtained by optimizing the device illustrated in FIG. 3. Compared with the device illustrated in FIG. 3, the device illustrated in FIG. 4 further includes a third obtaining unit 305 and an activating unit 306.

The third obtaining unit 305 is configured to obtain a second RSSI value when a geographical position of the terminal changes.

The activating unit 306 is configured to activate roaming scan to connect the terminal to a second AP, when the second RSSI value is less than the roaming threshold.

According to the implementation of the disclosure, functional units may be divided for the device for setting Wi-Fi roaming in accordance with the foregoing method examples. For example, each functional unit may be divided according to each function, and two or more functions may be integrated in one processing unit. The above-mentioned integrated unit can be implemented in the form of hardware or software functional units. For example, the second obtaining unit 303, the setting unit 304, and the activating unit 306 may be integrated in a central processing unit (CPU); the first obtaining unit 302 and the third obtaining unit 305 may be a Wi-Fi module. It should be noted that the division of units in the implementation of the present disclosure is schematic and is merely a logical function division, and there may be other division manners in actual implementation.

In an implementation, the device may further include a determining unit (not illustrated in the figures), a fourth obtaining unit (not illustrated in the figures), and a connecting unit (not illustrated in the figures).

The determining unit is configured to determine target geographical position information after the geographical position of the terminal changes.

The forth obtaining unit is configured to obtain a list of the target geographical position information.

In one implementation, the list contains identifiers of accessible APs and strengths of signals from the accessible APs. The connecting unit is configured to select from the list one AP strength of the signal from which is highest and to connect the terminal to the one AP.

In one implementation, the list contains identifiers of accessible APs and a security level of each accessible AP. the connecting unit is configured to select from the list one AP with the highest security level and to connect the terminal to the one AP.

After the geographical position of the terminal changes, the determining unit determines the target geographical position information. The fourth obtaining unit obtains the list of the target geographical position information, and the connecting unit selects from the list the AP the strength of the signal from which is highest and connects the terminal to the AP. The above-mentioned list may be a list preset by a user and contain identifiers of commonly used APs, and may also contain identifiers of APs to which the terminal was successfully connected in the geographical position. In this way, searching of APs that were determined to be unable to be connected to can be avoided, thereby reducing workload of network searching, and reducing power consumption of the terminal.

In one implementation, in order to improve the security of data transmission of the terminal via a Wi-Fi network, the connecting unit can query in the list for a security level of network service provided by each AP, select from the list one AP with the highest security level, and connect the terminal to the AP with the highest security level.

The determining unit and the fourth obtaining unit may be integrated in the CPU. The connecting unit may be the Wi-Fi module.

It can be seen that, by adopting the device illustrated in FIG. 4, the roaming threshold for triggering Wi-Fi roaming can be dynamically adjusted according to the RSSI value, thereby avoiding frequent roaming or slow roaming caused by a mismatch between the roaming threshold and a current network situation.

Figure 5:
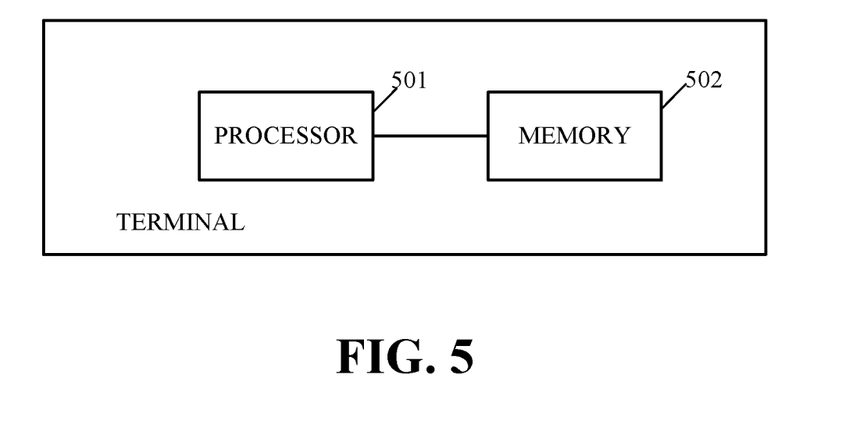
FIG. 5 is a block diagram illustrating a terminal according to an implementation of the present disclosure.

Referring to FIG. 5, FIG. 5 is a block diagram illustrating a terminal 500 according to an implementation of the present disclosure. As illustrated in FIG. 5, the terminal 500 includes a processor 501 and a memory 502. The memory 502 may be configured to provide a cache required for data processing performed by the processor 501, and may also be configured to provide storage space of data invoked and result data obtained by data processing performed by the processor 501.

In the implementation of the present disclosure, the processor 501 is configured to invoke the executable program codes stored in the memory 502 to execute the following operations.

A first RSSI value is obtained when the terminal is connected to a first AP. An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

It can be seen that, according to the terminal illustrated in FIG. 5, the roaming threshold for triggering Wi-Fi roaming can be dynamically adjusted according to the RSSI value of the received wireless network signal, thereby avoiding frequent roaming or slow roaming caused by a mismatch between the roaming threshold and a current network situation.

Figure 6:
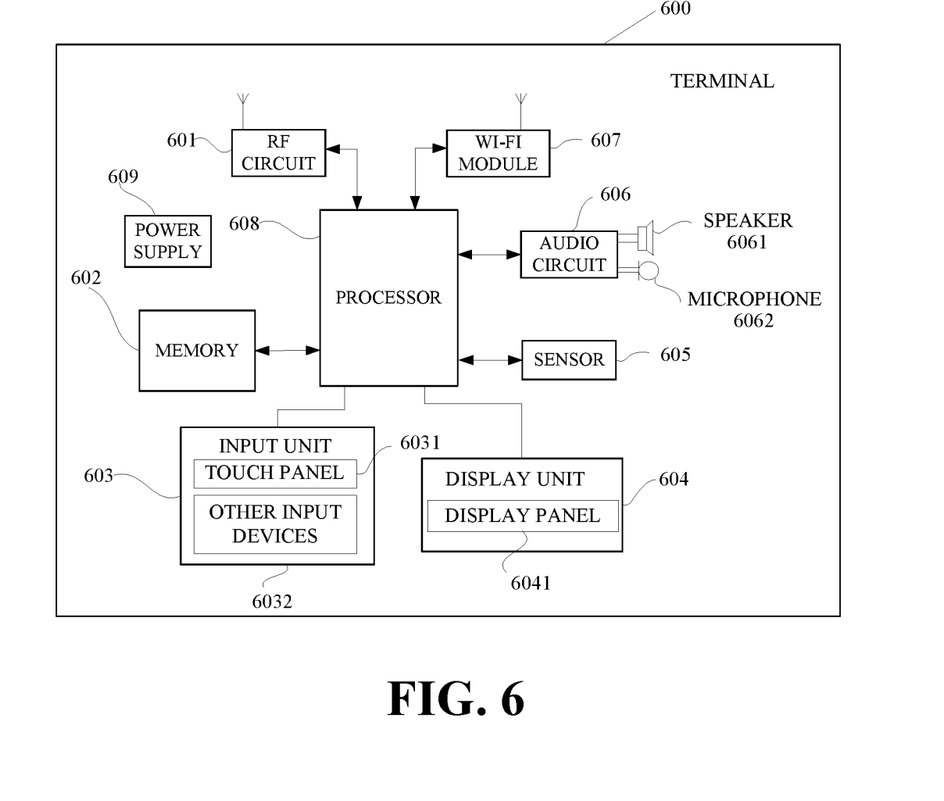
FIG. 6 is a block diagram illustrating another terminal according to an implementation of the present disclosure.

Referring to FIG. 6, FIG. 6 is a block diagram illustrating another terminal 600 according to an implementation of the present disclosure. As illustrated in FIG. 6, only parts related to the implementations of the present disclosure are illustrated for ease of description. For technical details not described, reference may be made to the method implementations of the present disclosure.

The terminal may be any terminal, such as a mobile phone, a tablet computer, a PDA, a POS, an on-board computer, and the like. The following describes the mobile phone as an example of the terminal.

FIG. 6 is a block diagram of a part of a structure of a mobile phone related to a terminal according to an implementation of the present disclosure. As illustrated in FIG. 6, the mobile phone includes a radio frequency (RF) circuit 601, a memory 602, an input unit 603, a display unit 604, a sensor 605, an audio circuit 606, a Wi-Fi module 607, a processor 608, a power supply 609, and other components. Those skilled in the art can understand that the structure of the mobile phone illustrated in FIG. 6 does not constitute any limitation on a mobile phone. The mobile phone configured to implement technical solutions of the disclosure may include more or fewer components than illustrated, combine certain components, or have different component configuration.

In the following, various components of the mobile phone will be described in detail with reference to FIG. 6.

The RF circuit 601 is configured to transmit or receive information, or to transmit or receive signals during a call. In one implementation, the RF circuit 601 is configured to receive downlink information of a base station, which will be processed by the processor 608. In addition, the RF circuit 601 is configured to transmit uplink data to the base station. Generally, the RF circuit 601 includes but is not limited to an antenna, at least one amplifier, a transceiver, a coupler, a low noise amplifier (LNA), a duplexer, and the like. In addition, the RF circuit 601 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 602 is configured to store software programs and modules, and the processor 608 is configured to execute various function applications and data processing of the mobile phone by running the software programs and the modules stored in the memory 602. The memory 602 mainly includes a program storage area and a data storage area. The program storage area may store an operating system, application programs required for at least one function, and so on. The data storage area may store data (such usage parameters of an application) created according to use of the mobile phone, and so on. In addition, the memory 602 may include a high-speed RAM, and may further include a non-volatile memory such as at least one disk storage device, a flash device, or other non-volatile solid storage devices.

The input unit 603 may be configured to receive input digital or character information, and to generate key signal input associated with user setting and function control of the mobile phone. In one implementation, the input unit 603 may include a touch panel 6031 and other input devices 6032. The touch panel 6031, also known as a touch screen, is configured to collect touch operations generated by the user on or near the touch panel 6031 (such as operations generated by the user using any suitable object or accessory such as a finger or a stylus to touch the touch panel 6031 or areas near the touch panel 6031), and to drive a corresponding connection device according to a preset program. In one implementation, the touch panel 6031 may include two parts of a touch detection device and a touch controller. The touch detection device is configured to detect the user's touch orientation and a signal brought by the touch operation, and to transmit the signal to the touch controller. The touch controller is configured to receive the touch information from the touch detection device, to convert the touch information into contact coordinates, and to transmit the contact coordinates to the processor 608 again. The touch controller can also receive and execute commands from the processor 608. In addition, the touch panel 6031 may be implemented in various types such as resistive, capacitive, infrared, surface acoustic waves, etc. In addition to the touch panel 6031, the input unit 603 may further include other input devices 6032. In one implementation, the other input devices 6032 may include, but not limit to, one or more of physical keyboard, function keys (such as volume control buttons, switch buttons, etc.), a trackball, a mouse, a joystick, and the like.

The display unit 604 is configured to display information input by the user, information provided for the user, or various menus of the mobile phone. The display unit 604 may include a display panel 6041, and alternatively, the display panel 6041 may be in the form of a liquid crystal display (LCD), an organic light-emitting diode (OLED), and so on. In one implementation, the touch panel 6031 may cover the display panel 6041. After the touch panel 6031 detects a touch operation on or near the touch panel 6031, the touch panel 6031 transmits the touch operation to the processor 608 to determine a type of the touch event, and then the processor 608 provides a corresponding visual output on the display panel 6041 according to the type of the touch event. Although the touch panel 6031 and the display panel 6041 are illustrated as two separate components in FIG. 6 to realize the input and output functions of the mobile phone, in some implementations, the touch panel 6031 may be integrated with the display panel 6041 to implement the input and output functions of the mobile phone.

The mobile phone may also include at least one sensor 605, such as a light sensor, a motion sensor, and other sensors. In one implementation, the light sensor may include an ambient light sensor and a proximity sensor, among which the ambient light sensor may adjust the brightness of the display panel 6041 according to ambient lights, and the proximity sensor may turn off the display panel 6041 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also be configured for applications related to identification of mobile-phone gestures (such as vertical and horizontal screen switch), or can be used for vibration-recognition related functions (such as a pedometer, percussion), and so on. In addition, the mobile phone can also be equipped with a gyroscope, a barometer, a hygrometer, a thermometer, an infrared sensor, and other sensors, and it will not be repeated herein.

The audio circuit 606, a speaker 6061, and a microphone 6062 may provide an audio interface between the user and the mobile phone. The audio circuit 606 may convert the received audio data to electrical signals and transmit the electrical signals to the speaker 6061; thereafter the speaker 6061 may convert the electrical signals to sound signals to output. On the other hand, the microphone 6062 may convert the received sound signals to electrical signals, which will be received and converted to audio data by the audio circuit 606 to output to the processor 608. The audio data is then processed by the processor 608 and transmitted via the RF circuit 601 to another mobile phone. Alternatively, the audio data may be output to the memory 602 for further processing.

Wi-Fi belongs to a short-range wireless transmission technology. With aid of the Wi-Fi module 607, the mobile phone may assist the user in E-mail receiving and sending, webpage browsing, access to streaming media, and the like. Wi-Fi provides users with wireless broadband Internet access. Although the Wi-Fi module 607 is illustrated in FIG. 6, the Wi-Fi module 607 is not essential to the mobile phone and can be omitted according to actual needs without departing from the essential nature of the present disclosure.

The processor 608 is a control center of the mobile phone and is configured to connect various parts of the whole mobile phone through various interfaces and lines, to run or execute software programs and/or modules stored in the memory 602, and to invoke data stored in the memory 602 to perform various functions of the mobile phone and process data, thereby monitoring the mobile phone as a whole. In one implementation, the processor 608 may include one or more processing units. For example, the processor 608 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 608.

The mobile phone also includes a power supply 609 (e.g., a battery) that supplies power to various components. For instance, the power supply 609 may be logically connected to the processor 608 via a power management system to enable management of charging, discharging, and power consumption through the power management system.

Although not illustrated, the mobile phone may include a camera, a Bluetooth module, etc., and the disclosure will not elaborate herein.

The method of the foregoing implementations can be realized based on the structure of the terminal. Both the application layer and the operating system kernel can be considered as part of the abstraction structure of the processor 608.

In the implementations of the present disclosure, the processor 608 is configured to invoke program codes stored in the memory 602 to execute the following operations.

A first RSSI value is obtained when the terminal is connected to a first AP. An RSSI adjustment value is obtained by subtracting a preset RSSI weight from the first RSSI value. A preset RSSI lower limit is set to be a roaming threshold when the RSSI adjustment value is greater than the preset RSSI lower limit, and the RSSI adjustment value is set to be the roaming threshold when the RSSI adjustment value is less than or equal to the preset RSSI lower limit, where the roaming threshold is used to trigger the terminal to roam between different Wi-Fi networks.

The processor 608 is further configured to invoke the program codes stored in the memory 602 to execute the following operations.

When a geographical position of the terminal changes, a second RSSI value is obtained. Roaming scan is activated to connect the terminal a second AP, when the second RSSI value is less than the roaming threshold.

The processor 608 is further configured to invoke the program codes stored in the memory 602 to execute the following operations.

Whether the terminal is able to access a network after being connected to the second AP is determined. When it is determined that the terminal is unable to access the network after being connected to the second AP, the terminal is disconnected from the second AP and is reconnected to the first AP.

In an implementation, the processor 608 is further configured to invoke the program codes stored in the memory 602 to execute the following operations.

Based on a determination that the terminal is unable to access the network after being connected to the second AP, the second AP is added to a blacklist to prevent the terminal from being connected to the second AP.

In an implementation, the processor 608 is further configured to invoke the program codes stored in the memory 602 to execute the following operations.

Based on a determination that the terminal is unable to access the network after being connected to the second AP, an EES is searched for determining strength of signals from APs other than from the second AP. A third AP other than the second AP is selected from the EES and is connected to, where the third AP is operable to transmit a signal having the highest strength.

It can be seen that, according to the terminal illustrated in FIG. 6, the roaming threshold for triggering Wi-Fi roaming can be dynamically adjusted according to the RSSI value of the wireless network signal currently received, thereby avoiding frequent roaming or slow roaming caused by a mismatch between the roaming threshold and a current network situation.

Implementations of the present disclosure also provide a computer storage medium. The computer storage medium stores computer programs for electronic data interchange which, when executed, are operable with a computer to execute all or part of the operations of any of the methods described in the above method implementations. The computer may include a terminal.

Implementations of the present disclosure also provide a computer program product. The computer program product includes a non-transitory computer readable storage medium that stores computer programs. The computer programs are operable with a computer to perform all or part of the operations of any of the methods described in the above method implementations. The computer program product may be a software installation package. The computer may include a terminal.

It is to be noted that, each unit in the implementations of the device for setting Wi-Fi roaming and the terminals is divided according to functional logic, but is not limited to the above division, as long as the corresponding function can be implemented. In addition, the specific names of the functional units are also only for the purpose of distinguishing from each other, and are not intended to limit the scope of the present disclosure.

It will be understood by those of ordinary skill in the art that all or a part of the various methods of the implementations described above may be accomplished by means of a program to instruct associated hardware. The program may be stored in a computer-readable memory, which may be a read-only memory, disk, compact disc, and so on.

The above is only preferred implementations of the present disclosure, but the protection scope of the present disclosure is not limited thereto. Any changes or substitutions that may be easily conceived by those skilled in the art within the technical scope of the implementations the present disclosure are intended to be included within the protection scope of the present disclosure. Therefore, the protection scope of the disclosure is subject to the protection scope of the claims.

What is claimed is:

1. A method for setting wireless fidelity (Wi-Fi) roaming, comprising:
    monitoring an operation of connecting a terminal to a first access point (AP);
    obtaining a first received signal strength indication (RSSI) value of a signal of a wireless network received by the terminal after the terminal is connected to the first AP;
    determining whether an RSSI adjustment value is greater than a preset RSSI lower limit, wherein the RSSI adjustment value is a difference between the first RSSI and a preset RSSI weight;
    setting the preset RSSI lower limit to be a roaming threshold in response to determining that the RSSI adjustment value is greater than the preset RSSI lower limit;
    setting the RSSI adjustment value to be the roaming threshold in response to determining that the RSSI adjustment value is less than or equal to the preset RSSI lower limit;
    obtaining a second RSSI value of a signal of the wireless network currently received by the terminal when a geographical position of the terminal changes;
    determining whether the second RSSI is less than the roaming threshold;
    activating roaming scanning to switch from the first AP to a second AP in response to determining that the second RSSI value is less than the roaming threshold;
    determining whether the terminal is able to access the wireless network after being connected to the second AP; and
    disconnecting the terminal from the second AP and reconnecting the terminal to the first AP based on a determination that the terminal is unable to access the wireless network.

2. The method of claim 1, further comprising:
    before activating the roaming scanning:
    obtaining a list of the geographic position, the list containing identifiers of a plurality of accessible APs and strength of signals from the plurality of accessible APs; and
    determining the second AP to be connected to, the second AP being one of the plurality of accessible APs that is operable to transmit a signal having the highest strength.

3. The method of claim 1, further comprising:
    before activating the roaming scanning:
    obtaining a list of the geographic position, the list containing identifiers of a plurality of accessible APs and a security level of each of the plurality of accessible APs; and
    determining the second AP to be connected to, the second AP being one of the plurality of accessible APs having the highest security level.

4. The method of claim 1, further comprising:
    after activating the roaming scanning:
    determining whether the terminal is able to access the wireless network; and
    adding the second AP to a blacklist to prevent the terminal from being connected to the second AP based on a determination that the terminal is unable to access the wireless network.

5. The method of claim 1, further comprising:
    after activating the roaming scanning:
    determining whether the terminal is able to access the wireless network;
    selecting a third AP from an extended service set (EES) based on a determination that the terminal is unable to access the wireless network, wherein the third AP is operable to transmit a signal having strength higher than that of signals from other APs in the EES other than the second AP; and
    connecting the terminal to the third AP.

6. The method of claim 1, wherein determining whether the terminal is able to access the wireless network comprises:
    sending a test data frame to a wireless station (STA) failing to be connected to the second AP;
    determining that the terminal is able to access the wireless network when the terminal receives a response frame from the STA; and
    determining that the terminal is unable to access the wireless network when the terminal fails to receive the response frame.

7. The method of claim 1, further comprising:
    before obtaining the first RSSI value:
    obtaining a sliding track input by a user;
    activating a Wi-Fi network function of the terminal to search for at least one accessible AP, when the sliding track is for activating the Wi-Fi network function; and
    connecting the terminal to the first AP when the first AP is detected.

8. A terminal comprising:
    at least one processor; and
    a computer readable memory, coupled to the at least one processor and storing at least one computer executable instruction therein, which when executed by the at least one processor, causes the at least one processor to carry out actions, comprising:
- monitoring an operation of connecting the terminal to a first access point (AP);
- obtaining a first received signal strength indication (RSSI) value of a signal of a wireless network received by the terminal after the terminal is connected to the first AP;
- determining whether an RSSI adjustment value is greater than a preset RSSI lower limit, wherein the RSSI adjustment value is a difference between the first RSSI and a preset RSSI weight;
- setting the preset RSSI lower limit to be a roaming threshold in response to determining that the RSSI adjustment value is greater than the preset RSSI lower limit;
- setting the RSSI adjustment value to be the roaming threshold in response to determining that the RSSI adjustment value is less than or equal to the preset RSSI lower limit;
- obtaining a second RSSI value of a signal of the wireless network currently received by the terminal when a geographical position of the terminal changes;
- determining whether the second RSSI is less than the roaming threshold;
- activating roaming scanning to switch from the first AP to a second AP in response to determining that the second RSSI value is less than the roaming threshold;
- determining whether the terminal is able to access the wireless network after being connected to the second AP; and
- disconnecting the terminal from the second AP and reconnecting the terminal to the first AP based on a determination that the terminal is unable to access the wireless network.

9. The terminal of claim 8, wherein the at least one computer executable instruction further causes the at least one processor to carry out actions, comprising:
- obtaining a list of the geographic position, the list containing identifiers of a plurality of accessible APs and strength of signals from the plurality of accessible APs; and
- determining the second AP to be connected to, the second AP being one of the plurality of accessible APs that is operable to transmit a signal having the highest strength.

10. The terminal of claim 8, wherein the at least one computer executable instruction further causes the at least one processor to carry out actions, comprising:
- obtaining a list of the geographic position, the list containing identifiers of a plurality of accessible APs and a security level of each of the plurality of accessible APs; and
- determining the second AP to be connected to, the second AP being one of the plurality of accessible APs having the highest security level.

11. The terminal of claim 8, wherein the at least one computer executable instruction further causes the at least one processor to carry out actions, comprising:
- determining whether the terminal is able to access the wireless network; and
- adding the second AP to a blacklist to prevent the terminal from being connected to the second AP, based on a determination that the terminal is unable to access the wireless network.

12. The terminal of claim 8, wherein the at least one computer executable instruction further causes the at least one processor to carry out actions, comprising:
- determining whether the terminal is able to access the wireless network;
- selecting a third AP from an extended service set (EES) based on a determination that the terminal is unable to access the wireless network, wherein the third AP is operable to transmit a signal having strength higher than that of signals from other APs in the EES other than the second AP; and
- connecting the terminal to the third AP.

13. The terminal of claim 8, wherein the at least one processor carrying out the action of determining whether the terminal is able to access the wireless network is caused to carry out actions, comprising:
- sending a test data frame to a wireless station (STA) failing to be connected to the second AP;
- determining that the terminal is able to access the wireless network when the terminal receives a response frame from the STA; and
- determining that the terminal is unable to access the wireless network when the terminal fails to receive the response frame.

14. The terminal of claim 8, wherein the at least one computer executable instruction further causes the at least one processor to carry out actions, comprising:
- obtaining a sliding track input by a user;
- activating a Wi-Fi network function of the terminal to search for at least one accessible AP when the sliding track is for activating the Wi-Fi network function; and
- connecting the terminal to the first AP when the first AP is detected.

15. A non-transitory computer-readable storage medium storing at least one computer program which, when executed by at least one processor, causes the at least one processor to carry out actions, comprising:
- monitoring an operation of connecting a terminal to a first access point (AP);
- obtaining a first received signal strength indication (RSSI) value of a signal of a wireless network received by the terminal after the terminal is connected to the first AP;
- determining whether an RSSI adjustment value is greater than a preset RSSI lower limit, wherein the RSSI adjustment value is a difference between the first RSSI and a preset RSSI weight;
- setting the preset RSSI lower limit to be a roaming threshold in response to determining that the RSSI adjustment value is greater than the preset RSSI lower limit;
- setting the RSSI adjustment value to be the roaming threshold in response to determining that the RSSI adjustment value is less than or equal to the preset RSSI lower limit;
- obtaining a second RSSI value of a signal of the wireless network currently received by the terminal when a geographical position of the terminal changes;
- determining whether the second RSSI is less than the roaming threshold;
- activating a roaming scan to switch from the first AP to a second AP in response to determining that the second RSSI value is less than the roaming threshold;

determining whether the terminal is able to access the wireless network after being connected to the second AP; and disconnecting the terminal from the second AP and reconnecting the terminal to the first AP based on a determination that the terminal is unable to access the wireless network.

* * * * *